(12) United States Patent
Serebrin

(10) Patent No.: US 9,436,751 B1
(45) Date of Patent: Sep. 6, 2016

(54) SYSTEM AND METHOD FOR LIVE MIGRATION OF GUEST

(71) Applicant: Google Inc., Mountain View, CA (US)

(72) Inventor: Benjamin Charles Serebrin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 214 days.

(21) Appl. No.: 14/132,477

(22) Filed: Dec. 18, 2013

(51) Int. Cl.
*G06F 17/30* (2006.01)
*G06F 9/48* (2006.01)

(52) U.S. Cl.
CPC ....... *G06F 17/30575* (2013.01); *G06F 9/4856* (2013.01)

(58) Field of Classification Search
CPC .................. G06F 17/30575; G06F 9/4856
USPC ............................................ 707/624
See application file for complete search history.

(56) References Cited

U.S. PATENT DOCUMENTS

| | | | | |
|---|---|---|---|---|
| 7,353,360 B1* | 4/2008 | Muller | ............... | G06F 12/12 709/223 |
| 7,447,854 B1* | 11/2008 | Cannon | ............... | G06F 11/1451 711/162 |
| 7,673,113 B2* | 3/2010 | Sugumar | ............... | G06F 9/5088 711/170 |
| 8,146,082 B2* | 3/2012 | Belay | ............... | G06F 9/45558 711/6 |
| 8,156,301 B1* | 4/2012 | Khandelwal | ........ | G06F 9/45558 711/112 |
| 8,175,863 B1* | 5/2012 | Ostermeyer | ........ | G06F 17/5009 703/13 |
| 8,386,731 B2 | 2/2013 | Mashtizadeh et al. | | |
| 8,392,628 B2* | 3/2013 | Santos | ............... | G06F 12/1081 710/22 |
| 8,407,518 B2* | 3/2013 | Nelson | ............... | G06F 11/203 714/13 |
| 8,407,702 B2* | 3/2013 | Ikegaya | ............... | G06F 9/455 718/1 |
| 8,468,288 B2* | 6/2013 | Corry | ............... | G06F 9/4856 711/170 |
| 8,521,912 B2* | 8/2013 | Aloni | ............... | G06F 9/45537 709/224 |
| 8,527,990 B1* | 9/2013 | Marathe | ............... | G06F 9/45558 718/1 |
| 8,533,713 B2* | 9/2013 | Dong | ............... | G06F 9/4856 718/1 |
| 8,819,678 B2* | 8/2014 | Tsirkin | ............... | G06F 9/45558 709/227 |
| 9,063,866 B1* | 6/2015 | Tati | ............... | G06F 12/10 |

(Continued)

FOREIGN PATENT DOCUMENTS

| | | |
|---|---|---|
| CN | 102136993 A | 7/2011 |
| CN | 102521038 A | 6/2012 |

(Continued)

OTHER PUBLICATIONS

Clark et al., "Live Migration of Virtual Machines", The 2nd Symposium on Networked Systems Design & Implementation (NSDI '05), pp. 273-286, 2005.*

(Continued)

*Primary Examiner* — Phuong Thao Cao
(74) *Attorney, Agent, or Firm* — Lerner, David, Littenberg, Krumholz & Mentlik, LLP

(57) ABSTRACT

A method and apparatus are provided to perform live migration of a guest in a computer system using device assignment. In this method and apparatus, one or more pages of the guest are copied to a target computer system. It is determined which pages have been copied, and what incremental changes have been made to the pages that were copied. For example, the incremental changes may be indicated to a hypervisor of an initial host of the guest by a network interface controller or other device in the computer system. The incremental changes are then copied to the target computer system. Detection and copying of incremental changes may continue until a time when all dirty pages can be copied to the target computer system.

17 Claims, 7 Drawing Sheets

(56) References Cited

U.S. PATENT DOCUMENTS

| | | | |
|---|---|---|---|
| 9,087,115 B1* | 7/2015 | McCline | G06F 17/30575 |
| 9,164,795 B1* | 10/2015 | Vincent | G06F 9/4856 |
| 9,176,767 B2* | 11/2015 | Cantu | G06F 9/45558 |
| 9,197,489 B1* | 11/2015 | Vincent | H04L 67/148 |
| 9,201,612 B1* | 12/2015 | Vincent | G06F 3/0662 |
| 9,215,152 B2* | 12/2015 | Fayssal | H04L 43/028 |
| 9,317,326 B2* | 4/2016 | Ramanathan | G06F 9/45533 |
| 9,317,444 B2* | 4/2016 | Davda | G06F 13/28 |
| 2005/0044448 A1* | 2/2005 | Verdun | G06F 1/3225 714/22 |
| 2005/0138242 A1* | 6/2005 | Pope | G06F 9/544 710/48 |
| 2008/0059726 A1* | 3/2008 | Rozas | G06F 21/53 711/156 |
| 2008/0133709 A1* | 6/2008 | Aloni | G06F 13/102 709/218 |
| 2008/0235477 A1* | 9/2008 | Rawson | G06F 12/109 711/165 |
| 2009/0063749 A1* | 3/2009 | Dow | G06F 12/08 711/6 |
| 2009/0063753 A1* | 3/2009 | Dow | G06F 8/61 711/6 |
| 2009/0064136 A1* | 3/2009 | Dow | G06F 9/5077 718/1 |
| 2009/0119663 A1* | 5/2009 | Mukherjee | G06F 12/1081 718/1 |
| 2009/0132822 A1* | 5/2009 | Chen | H04L 63/0428 713/171 |
| 2010/0250824 A1* | 9/2010 | Belay | G06F 9/45558 711/6 |
| 2011/0029734 A1* | 2/2011 | Pope | G06F 13/385 711/118 |
| 2011/0066597 A1* | 3/2011 | Mashtizadeh | G06F 3/0617 707/640 |
| 2011/0084973 A1* | 4/2011 | Masood | G06F 9/455 345/506 |
| 2011/0093646 A1* | 4/2011 | Koka | G06F 12/0817 711/103 |
| 2011/0099318 A1* | 4/2011 | Hudzia | G06F 9/45533 711/6 |
| 2011/0099319 A1* | 4/2011 | Mukherjee | G06F 12/1081 711/6 |
| 2011/0131576 A1* | 6/2011 | Ikegaya | G06F 9/455 718/1 |
| 2011/0142053 A1* | 6/2011 | Van Der Merwe | H04L 47/72 370/395.1 |
| 2011/0145471 A1* | 6/2011 | Corry | G06F 9/4856 711/6 |
| 2011/0179415 A1* | 7/2011 | Donnellan | G06F 9/45558 718/1 |
| 2011/0302577 A1* | 12/2011 | Reuther | G06F 9/45558 718/1 |
| 2011/0320556 A1* | 12/2011 | Reuther | G06F 9/4856 709/213 |
| 2012/0011504 A1* | 1/2012 | Ahmad | G06F 12/08 718/1 |
| 2012/0011508 A1* | 1/2012 | Ahmad | G06F 12/1009 718/1 |
| 2012/0017031 A1* | 1/2012 | Mashtizadeh | G06F 9/45558 711/6 |
| 2012/0042033 A1* | 2/2012 | Ayala, Jr. | G06F 9/4856 709/216 |
| 2012/0054367 A1* | 3/2012 | Ramakrishnan | G06F 9/4856 709/242 |
| 2012/0110237 A1* | 5/2012 | Li | G06F 9/45558 711/6 |
| 2012/0137098 A1* | 5/2012 | Wang | G06F 3/0617 711/165 |
| 2012/0159101 A1* | 6/2012 | Miyoshi | G06F 12/0284 711/162 |
| 2012/0209812 A1* | 8/2012 | Bezbaruah | G06F 9/45558 707/646 |
| 2012/0216007 A1* | 8/2012 | Tsirkin | G06F 9/526 711/173 |
| 2012/0221710 A1* | 8/2012 | Tsirkin | G06F 9/5077 709/224 |
| 2012/0221807 A1* | 8/2012 | Wade | G06F 9/45558 711/154 |
| 2012/0254582 A1* | 10/2012 | Raj | G06F 13/28 711/206 |
| 2012/0254862 A1* | 10/2012 | Dong | G06F 9/4856 718/1 |
| 2013/0024598 A1* | 1/2013 | Serebrin | G06F 12/1036 711/6 |
| 2013/0031331 A1* | 1/2013 | Cheriton | G06F 12/10 711/206 |
| 2013/0205106 A1* | 8/2013 | Tati | G06F 3/061 711/159 |
| 2013/0205113 A1* | 8/2013 | Ahmad | G06F 12/023 711/170 |
| 2013/0254404 A1* | 9/2013 | Johnsen | G06F 9/45533 709/226 |
| 2013/0254424 A1* | 9/2013 | Guay | G06F 9/4856 709/238 |
| 2013/0282792 A1* | 10/2013 | Graham | G06F 9/4445 709/203 |
| 2013/0326173 A1* | 12/2013 | Tsirkin | G06F 9/45558 711/162 |
| 2013/0326175 A1* | 12/2013 | Tsirkin | G06F 9/45558 711/162 |
| 2013/0346613 A1* | 12/2013 | Tarasuk-Levin | G06F 9/45558 709/226 |
| 2014/0089528 A1* | 3/2014 | Bloch | G06F 12/08 710/4 |
| 2014/0115164 A1* | 4/2014 | Kalyanaraman | H04L 29/08954 709/226 |
| 2014/0181435 A1* | 6/2014 | Privitt | G06F 11/2097 711/162 |
| 2014/0181461 A1* | 6/2014 | Kegel | G06F 12/1009 711/207 |
| 2014/0196037 A1* | 7/2014 | Gopalan | G06F 9/4856 718/1 |
| 2014/0215172 A1* | 7/2014 | Tsirkin | G06F 11/203 711/162 |
| 2014/0215459 A1* | 7/2014 | Tsirkin | G06F 9/45558 718/1 |
| 2014/0281056 A1* | 9/2014 | Davda | G06F 12/1081 710/26 |
| 2014/0282522 A1* | 9/2014 | Daly | G06F 9/45558 718/1 |
| 2014/0298338 A1* | 10/2014 | Doi | G06F 9/5016 718/1 |
| 2014/0325515 A1* | 10/2014 | Salmela | G06F 9/45533 718/1 |
| 2014/0359607 A1* | 12/2014 | Tsirkin | G06F 9/48 718/1 |
| 2014/0372717 A1* | 12/2014 | Ciu et al. | G06F 3/065 711/162 |
| 2015/0007172 A1* | 1/2015 | Hudzia | G06F 9/45533 718/1 |
| 2015/0052282 A1* | 2/2015 | Dong | G06F 13/32 710/308 |
| 2015/0149687 A1* | 5/2015 | Tsirkin | G06F 12/109 711/6 |
| 2015/0149999 A1* | 5/2015 | Ramanathan | G06F 9/4856 718/1 |
| 2015/0253991 A1* | 9/2015 | Nikaido | G06F 3/0665 711/114 |
| 2015/0261581 A1* | 9/2015 | Wang | G06F 9/00 711/162 |

FOREIGN PATENT DOCUMENTS

| | | | |
|---|---|---|---|
| WO | 2012063334 A1 | 5/2012 | |
| WO | 2013097903 A1 | 7/2013 | |

OTHER PUBLICATIONS

Jin et al., "Live Virtual Machine Migration with Adaptive Memory Compression", In Proceedings of Cluster Computing and Workshop, Aug. 2009, 10 pages.*

Product Datasheet, "VMware VMotion—Live Migration for Virtual Machines Without Service Interruption", Copyright.RTM. 2009 VMware, Inc., 2 pages, 2009.*

(56) References Cited

OTHER PUBLICATIONS

Zhang et al., "Exploiting Data Deduplication to Accelerate Live Virtual Machine Migration", 2010 IEEE International Conference on Cluster Computing, pp. 88-96, 2010.*

Du et al., "Microwiper: Efficient Memory Propagation in Live Migration of Virtual Machines", In 2010 39th International Conference on Parallel Processing, IEEE, pp. 141-149, 2010.*

Hines et al., "Post-Copy Live Migration of Virtual Machines", In Newsletter, ACM SIGOPS Operating Systems Review, vol. 43, Issue 3, Jul. 2009, pp. 14-26.*

Liu et al., "Heterogeneous Live Migration of Virtual Machines", In International Workshop on Virtualization Technology (IWVT '08), 2008, 9 pages.*

Santos et al., "Taming Heterogeneous NIC Capabilities for I/O Virtualization", dated Nov. 6, 2008, 13 pages, accessed online <https://www.usenix.org/legacy/event/wiov08/tech/full_papers/santos/santos.html/> on May 9, 2016.*

Travostino et al., "Seamless Live Migration of Virtual Machines over the MAN/WAN", Future Generation Computer Systems 22 (2006): pp. 901-907, 2006.*

Zhai et al., "Live Migration with Pass-Through Device for Linux VM", In Proceedings of the 2008 Ottawa Linux Symposium, pp. 261-268, Jul. 2008.*

"VMware vSphere 5.1 vMotion Architecture Performance and Best Practices", Performance Study, Copyright 2012, pp. 1-20.

Chiang, et al., "Physical Machine State Migration", Downloaded Nov. 26, 2013.

Lu, et al., "HSG-LM: Hybrid-Copy Speculative Guest OS Live Migration without Hypervisor", May 1, 2013, pp. 1-11.

Mashtizadeh, et al., "The Design and Evolution of Live Storage Migration in VMware ESX", VMware, Inc., Downloaded Nov. 26, 2013, pp. 1-14.

Williamson, "VFIO: Are we there yet?", redhat, Aug. 31, 2012, pp. 1-11.

Zhai, et al., "Live Migration with Pass-through Device for Linus VM", Linux Symposium, 2008, vol. 2, pp. 261-267.

* cited by examiner

IOMMU 630

| Device | Bus Address | Physical Address | Page | Dirty? |
|---|---|---|---|---|
| 1:2.3 | 0x1000 | 0x1000 | 1 | 0 |
| 1:2.3 | 0x1000 | 0x1000 | 2 | 1 |
| 4:5.6 | 0x2000 | 0x2000 | 1 | 0 |
| | | | | |

Fig. 6

SYSTEM AND METHOD FOR LIVE MIGRATION OF GUEST

BACKGROUND

Live migration is the act of moving an actively running virtual machine from one host machine to another, preserving virtual device connectivity and network connections. The guest operating system is intended to be unaware of the migration, though various implementations may induce a fake hotplug event, and performance is impacted variously at different stages over the course of the migration. During a typical migration, a hypervisor uses common techniques to iteratively copy all guest pages, and then just the recently-dirtied subset of guest pages, in order to reduce the blackout period where the guest must be paused for final state copying. However, this technique is not available in computer systems using device assignment, such as computer systems using an input/output memory management unit (IOMMU) to connect devices, because the hypervisor has no knowledge of which pages are dirtied by an assigned device.

SUMMARY

The present disclosure provides a system and method for live migration of a guest from an initial host to a target host in a computer system using device assignment. According to this method and system, dirty bits are provided by other devices in the computer system on behalf of the assigned devices. The dirty bits are then read, for example, by a hypervisor having access to the provided information.

One aspect of the disclosure provides a method for live migration of a guest in a computer system using device assignment. This method includes copying, using one or more processors, one or more pages of the guest from an initial computer system to a target computer system. The method further includes using the one or more processors to determine which pages have been copied and determine incremental changes made to the pages that have been copied. The incremental changes are then copied to the target system.

Another aspect of the disclosure provides an apparatus for live migration of a guest in a computer system using device assignment. The apparatus includes a memory and a processor in communication with the memory. The processor copies one or more pages of the guest to a target computer system, determines which pages have been copied, determines incremental changes made to the pages that have been copied, and copies the incremental changes.

Yet another aspect of the disclosure provides a non-transitory computer readable medium storing instructions executable by a processor to perform a method for live migration of a guest in a computer system using device assignment. The instructions provide for copying one or more pages of the guest to a target computer system, determining which pages have been copied, determining incremental changes made to the pages that have been copied, and copying the incremental changes.

BRIEF DESCRIPTION OF THE DRAWINGS

FIG. 6 depicts example page tables according to aspects of the disclosure.

DETAILED DESCRIPTION

Figure 1:
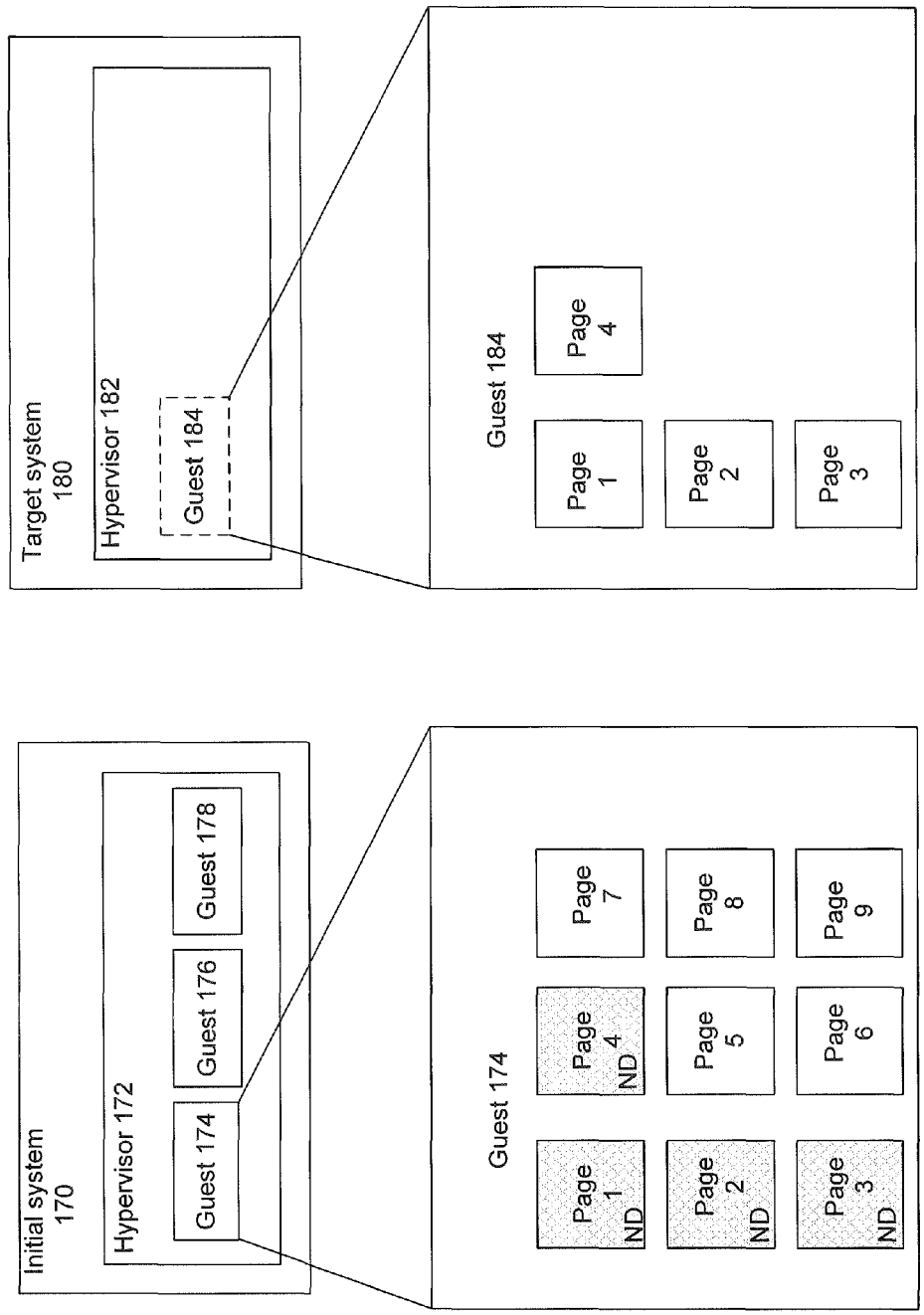
FIG. 1 illustrates an example of copying pages according to aspects of the disclosure.

The disclosure is directed to a method for moving active processes from a first computing device to a second computing device. In particular, an actively running Virtual Machine is moved from one host to another. According to this method, pages of guest memory are copied from the first host to the second host, for example, by a hypervisor. Each copied page is marked as being not dirty or not-writeable. Incremental changes, including subsequent writes, are detected and are also copied from the first host to the second host. Detection and copying of incremental changes may be performed continuously until a predetermined event, such as a timeout or a time when a rate at which pages are dirtied approaches a rate at which the dirtied pages can be sent to the second host. Alternatively or additionally, the guest machine may be paused while all incremental changes are copied from the first host to the second host, such that the guest may resume processing on the second host.

In copying the incremental changes, dirty pages may be identified on behalf of the guest. According to one example, the dirty pages may be tracked by a network interface controller (NIC), for example, by tracking bus addressed pages. The NIC may store a list of the dirty pages in a buffer or other memory, and the list may be accessed in copying the incremental changes. A separate list may be kept for each 4 KB page, or any other increment.

According to another example, identifying dirty pages on behalf of the guest includes using byte-enables to write bytes blindly without disturbing adjacent bytes. For example, the hypervisor may provide the NIC with a pre-zeroed contiguous buffer of bytes. For each 4 KB page that the NIC writes, the NIC writes a 1 to the corresponding byte in the buffer. The buffer can be in host physical memory and can be discontiguous if it is mapped by an input/output memory management unit (IOMMU). As another example, rather than writing a 1 to the corresponding byte in the buffer, the NIC may write a generation number, thereby allowing the hypervisor to scan for updates and copy only freshly-dirtied pages. In this example, the hypervisor may instruct the NIC to increment the generation number to N+1, wait for a predetermined event, and then scan for all generation N pages. In some examples, a hierarchy (e.g., a two-level, three-level, or n-level hierarchy) may be implemented, allowing the hypervisor to skip scanning large portions of buffer if no new value was written there. For example, the NIC may maintain a 64-bit bit vector that it sets internally on each write to the buffer. The NIC may set bit N when it writes byte (N/buffersize) of the buffer.

According to yet another example, identifying the dirty pages may be performed by an IOMMU, such as by virtualizing Virtualization Technology for Directed I/O (VT-d). For example, if the guest uses the virtualized VT-d, the guest may indicate to the hypervisor the pages for which it intends to give write access to the NIC. In this example, the entire set of pages indicated by the guest may be assumed to be dirty.

According to a further example, identifying the dirty pages may be performed by page table manipulation. For example, the NIC can set dirty bits in page table entries. As another example, a dirty bit can be created out of reserved bits in VT-d tables. Using the page tables, the hypervisor may perform the same memory scan for dirty pages as it performs for normal accessed memory.

FIG. 1 illustrates an example of moving an actively running virtual machine from a first host to a second host. As shown, initial computer system 170 includes hypervisor 172, which controls guests 174, 176, 178. The guests may be, for example, virtual machines or other processes. In this example, the guest 174 is being moved to target computer system 180, which includes hypervisor 182. Portions of the guest 174 that have been copied to the target computer system 180 are referenced as migrated guest 184.

In moving the guest 174 to the target computer system 180, pages of guest memory are copied from the initial computer system 170 to the target computer system 180. For example, the guest 174 includes pages 1-9. Of those, pages 1-4 have been copied to the target computer system 180. The pages 1-4 that have already been copied may be marked, for example, as not dirty or not writeable. The pages may be marked in nested or extended page tables, for example, by the hypervisor. Incremental changes to the copied pages 1-4 are detected and also copied to the target computer system 180.

Figure 2:
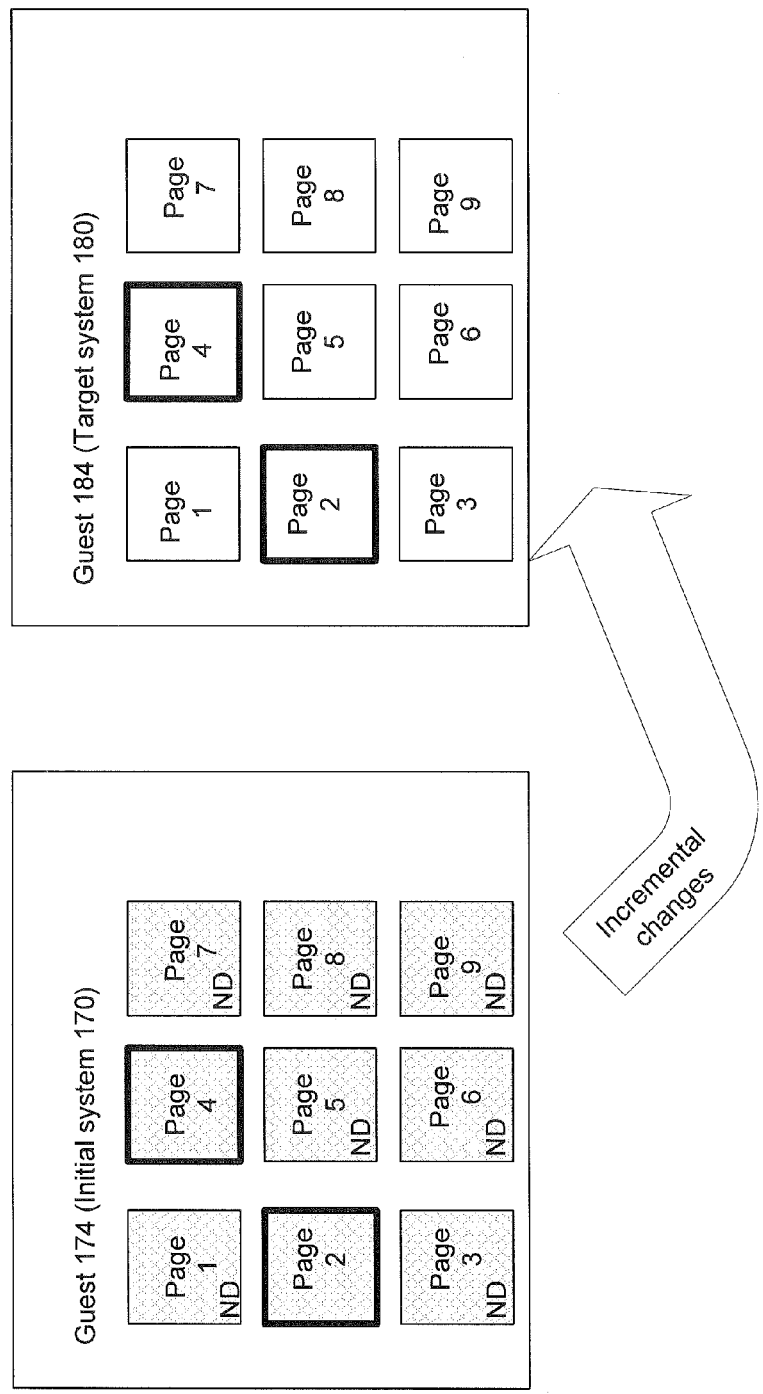
FIG. 2 illustrates an example of copying incremental changes according to aspects of the disclosure.

FIG. 2 illustrates the copying of incremental changes from the initial computer system 170 to the target computer system 180. In this example, each of pages 1-9 has been copied to the target computer system 180 and marked as not dirty. After copying, page 2 and page 4 were dirtied. For example, additional data may have been written to regions of pages 2 and 4. Accordingly, the changes made to pages 2 and 4 are detected, and copied to the target computer system 180. The detection and copying of incremental changes may be performed continuously until a predetermined event. Examples of such a predetermined event include a timeout, a time when a rate at which pages are dirtied approaches a rate at which the dirtied pages can be sent to the target computer system 180, etc. In some examples, the guest 174 may be paused while all incremental changes are copied to the target computer system 180. When all incremental changes are copied, the migrated guest 184 may resume processing on the target computer system 180.

Detection of the incremental changes may be performed in any of a number of ways. For example, dirtied pages may be tracked by a network interface controller (NIC), using byte-enables, by an input/output memory management unit (IOMMU), using page table manipulation, etc. Various examples are described below. In each example, dirtied bits are provided on behalf of assigned devices, such that the dirtied regions may be copied.

Figure 3:
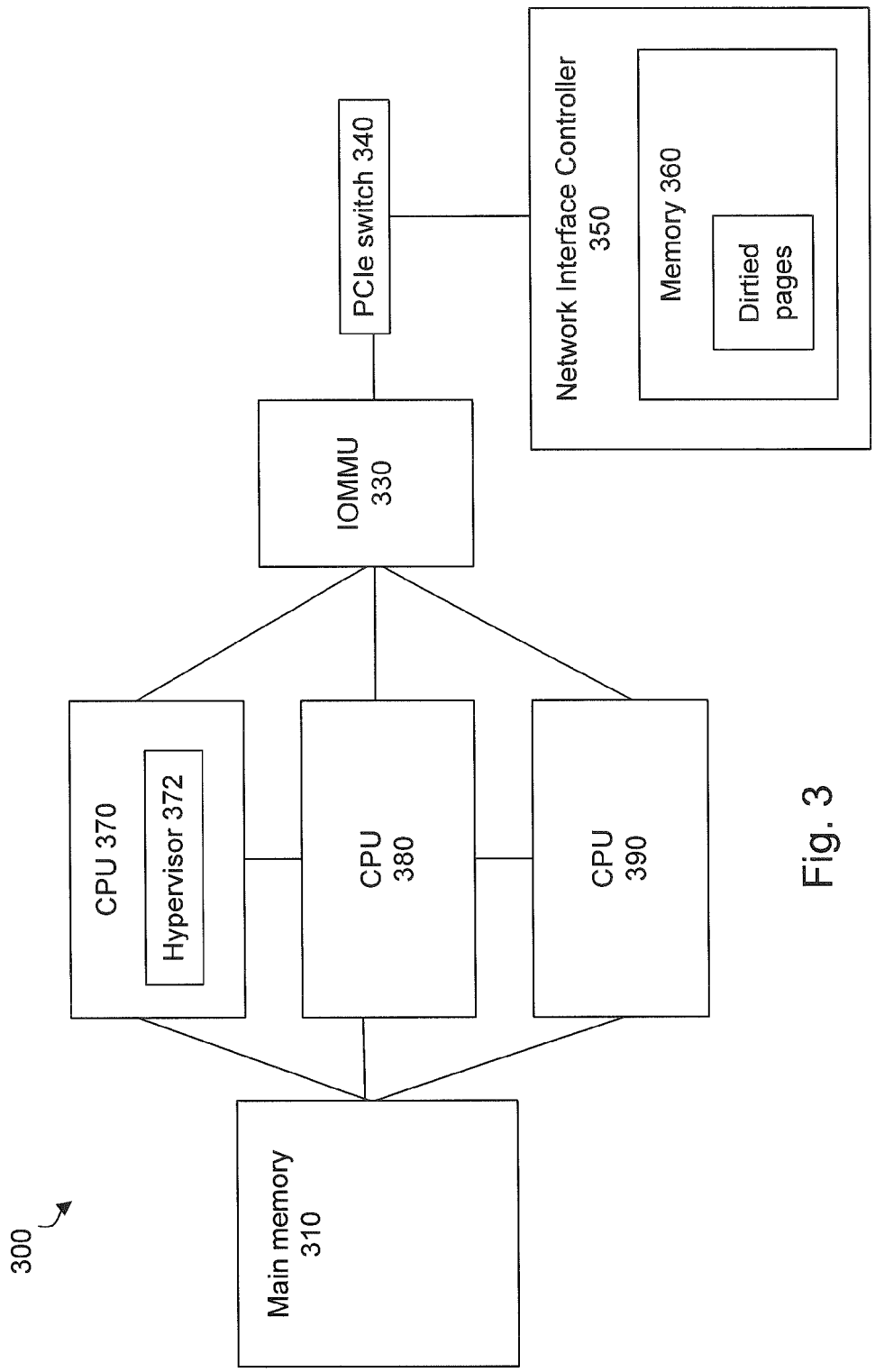
FIG. 3 is a schematic diagram of an example computer system according to aspects of the disclosure.

FIG. 3 illustrates a first example of identifying dirtied pages. In this example a NIC tracks the dirty pages by, for example, tracking bus addressed pages. The NIC stores a list of the dirty pages, and the list is accessible, for example by a hypervisor, in copying the incremental changes.

FIG. 3 depicts a schematic diagram of a computing system 300. The computing system 300 may be, for example, a system of computing devices interconnected on a motherboard. Such a network may be present in datacenters or other computing environments. The computer system 300 includes main memory 310 coupled to one or more central processing units (CPU) 370-390. The CPUs 370-390 are further coupled to an input/output memory management unit (IOMMU) 330. The IOMMU 330 and NIC 350 are connected via a peripheral interconnect card express (PCIe) switch 340.

The main memory 310 is accessible by the CPUs 370-390, and may store data and instructions executable by the CPUs 370-390. The main memory 310 may be any type of memory, such as read only memory, random access memory, removable storage media, cache, registers, or the like.

The CPUs 370-390 are connected to and communicate with the main memory 310 by, for example, a data bus and an address bus. Each of the CPUs 370-390 may be a microprocessor residing on a chip, a multi-core processor, or any other known processor. While only several CPUs are shown, any number of CPUs may be connected between the main memory 310 and the IOMMU 330.

The IOMMU 330 connects DMA-capable devices to the main memory 310. The PCIe switch 340 is a high speed interconnect providing for interconnection of one or more system devices, such as the NIC 350, to other components in the computer system 300. The PCIe switch 340 may be a motherboard-level interconnect, an expansion card interface, or the like. The system devices may communicate through the PCIe switch 340 over one or more links.

The NIC 350 tracks pages that it has dirtied. For example, the NIC 350 includes memory 360, which maintains an identification of pages including incremental changes. The memory 360 may be a buffer, RAM, removable storage medium, or any other type of memory. The identification of pages may be maintained as a list of dirtied pages, a spreadsheet, or any other format. According to one example, a large Bloomier filter or related device may be used in place of a list. This information may be accessible by other devices in copying the incremental changes. For example, if a guest is being migrated from the system 300 to another computer system, the CPU 370 may access a list of dirtied pages stored in the memory 360 of the NIC 350. According to one example, a separate list of incremental changes may be kept for predefine increments of data, such as a separate list for each 4 KB of a page.

The memory 360 may be relatively large in size. If the memory 360 is full, the NIC 350 can stall until space is cleared. According to some examples, the NIC 350 can send an interrupt to the hypervisor 372 when the memory 360 is near full. According to another example, the memory 360 may implement a cache of, for example, four entries of the last pages written.

While the computer system 300 has been described above as a system of devices on a motherboard, it should be understood that the computer system 300 may be any configuration of electronically coupled computing devices. For example, the network may include a backplane interconnecting peripherals, an expansion card interface, or the like. As another example, the connection between the computing devices may be hard-wired connections, wireless connections, or any other type of connections. As yet another example, the computer system 300 may include TCP/IP, 802.33, Ethernet, InfiniBand, or any other type of network.

Figure 4:
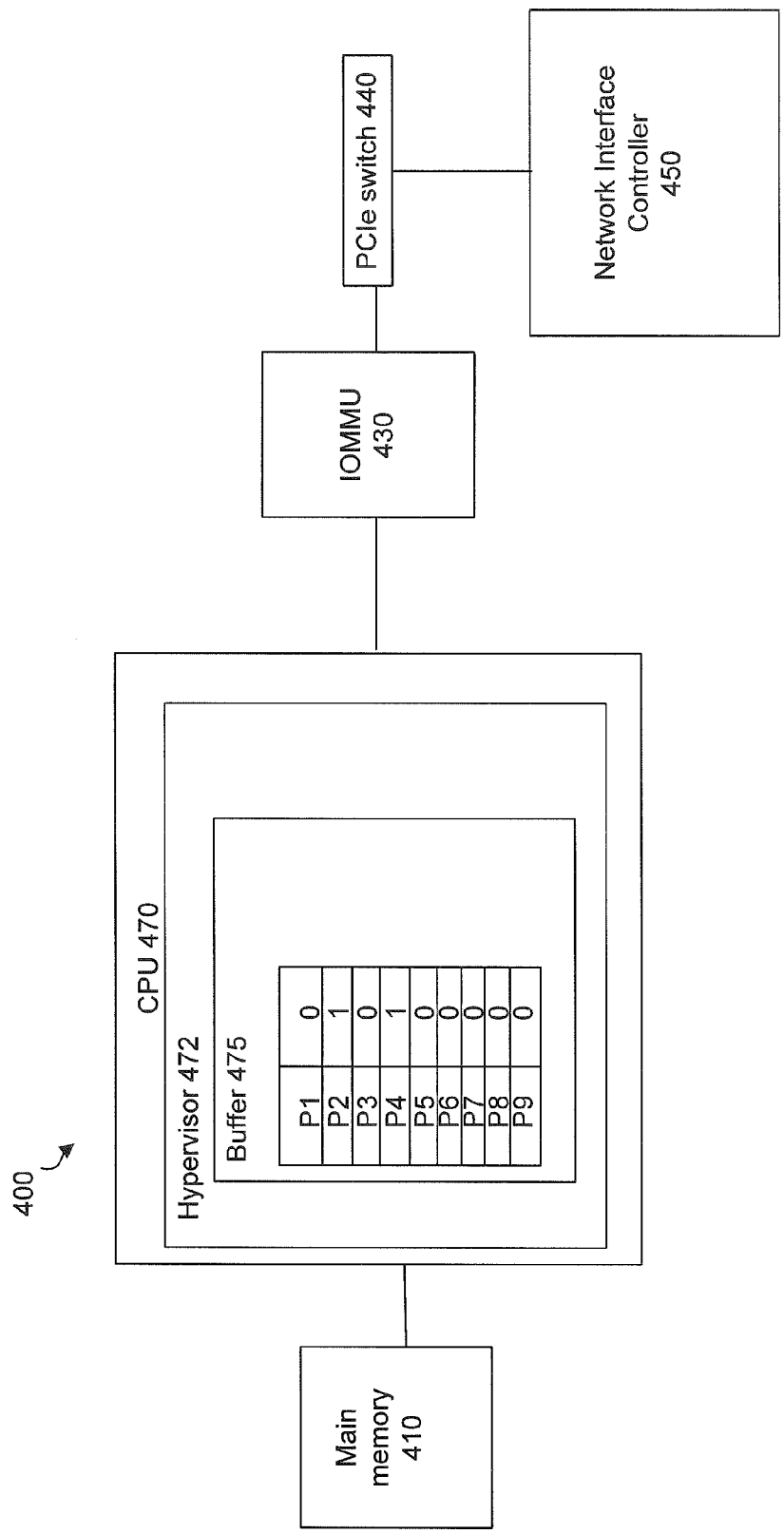
FIG. 4 is a schematic diagram of another example computer system according to aspects of the disclosure.

FIG. 4 illustrates another example of identifying dirtied pages. In this example, identifying dirty pages on behalf of the guest includes using byte-enables to write bytes blindly without disturbing adjacent bytes.

Computer system 400 includes components similar to the components of FIG. 3. For example, the computer system 400 includes main memory 410, a CPU 470, an IOMMU 430, a PCIe switch 440, and a NIC 450. The CPU 470 further includes hypervisor 472, which provides the NIC 450 with a buffer 475 of bytes. The NIC 450 may write to bytes in the buffer 475 to indicate which pages have been dirtied. The NIC may update the buffer each time it writes to a page of the virtual machine being migrated, periodically, or at any other time. According to one example, the buffer 475 may be a prezeroed contiguous buffer of bytes. A separate entry may be included for predefined portions of a page, such as an entry for every 4 KB. For each given increment of data that the NIC 450 writes, such as for each 4 KB page, the NIC 450 writes a 1 to the corresponding byte in the buffer 475. In the example shown, incremental changes were made to pages 2 and 4. Accordingly, the NIC 450 writes a 1 to the bytes corresponding to those pages in the buffer 475. According to some examples, such as where the buffer 475 is mapped by IOMMU 430, the buffer 475 may be discontiguous. Moreover, the buffer 475 may reside in the physical memory of the CPU 470, although other locations are possible.

As another example of using byte-enables, the NIC 450 may write a generation number to a buffer provided by the hypervisor 472, as opposed to a 1. By the NIC 450 writing a generation number to bytes corresponding to incremental changes, the hypervisor 472 can scan for updates and copy only freshly-dirtied pages. For example, the hypervisor 472 may instruct the NIC 450 to increment the generation number from N to N+1, wait for a predetermined event, and then scan for all generation N pages. The predetermined event may be, for example, a period of time passing, a timeout, a number of incremental changes being written, or the like.

In either of the above examples using byte-enables, a multi-level hierarchy may be implemented. For example, the buffer 475 may include two, three, or more levels of tables. In this regard, the hypervisor 472 can skip scanning large portions of buffer is no new value was written to a corresponding higher level table entry. For example, the NIC 450 may maintain a 64-bit bit vector that it sets internally on each write to the buffer. The NIC 450 may set bit N when it writes byte (N/buffersize) of the buffer. According to another example, if the host has 128 GB of storage, and will store 1 bit per 4 KB page, then the host can store 4*1024*1024 bits. A hierarchy including a number of tables, where a lowest level of the table is a 4 KB page containing 4096*8 bits, each bit representing a 4 KB page. Accordingly, each 4 KB page has enough bits to cover 128 MB. The second level of the hierarchy may be a 4 KB page, which is used as an array of 512 8-byte pointers to these 4 KB pages of bits. 64 GB can be covered with 512 pointers to the lowest level pages. A third level may be similar to the second in that it is an array of up to 512 8-byte pointers pointing to 2nd level tables. The third level in this example is not fully populated, and contains only 2 entries. Using this example structure, any of the level 2 or 3 tables can have a "not valid" indicating that scanning of the first level table is unnecessary. While the example above refers to x86 page tables, any type of page tables may be used. Moreover, a cache of the last entries written may be used to suppress byte-writes when the NIC 450 is writing to adjacent members of the same page.

Figure 5:
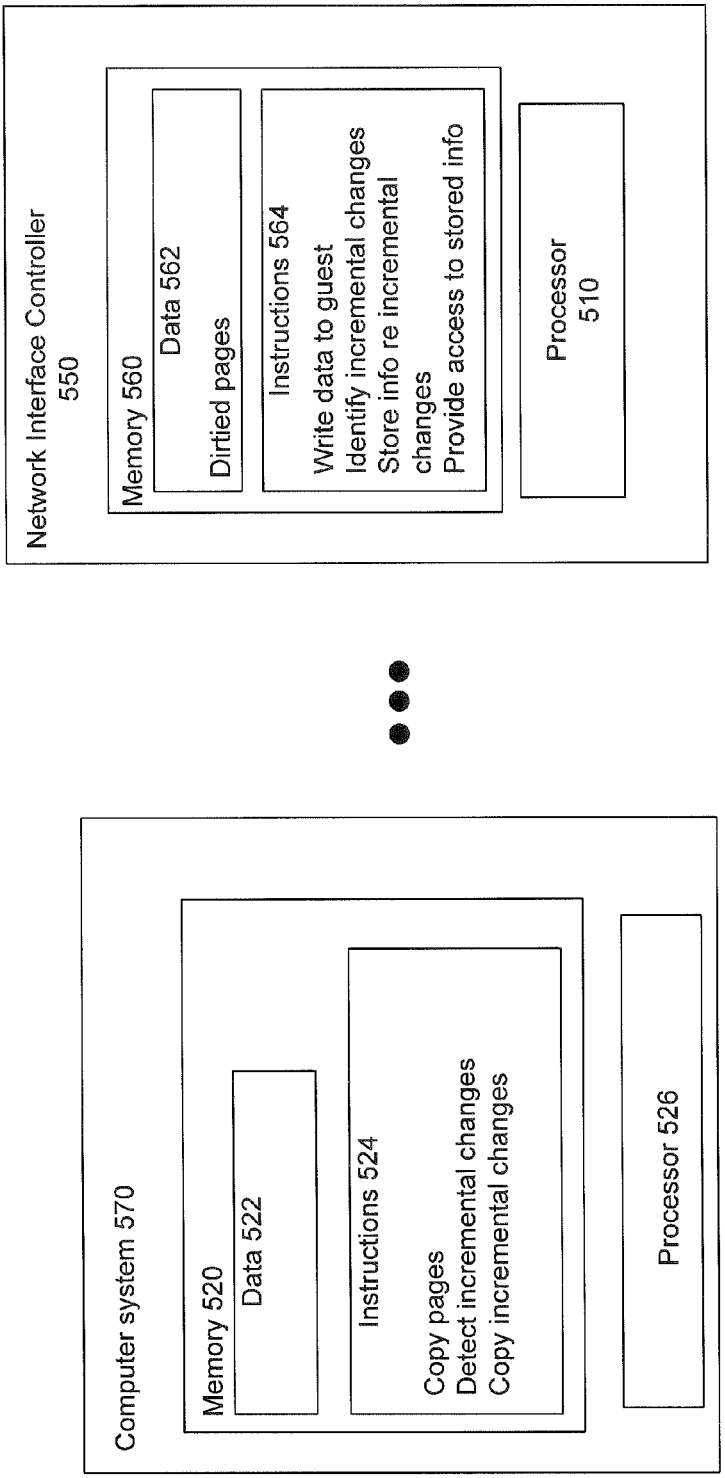
FIG. 5 is a block diagram of an example system according to aspects of the disclosure.

FIG. 5 illustrates an example system for identifying dirty pages on behalf of the virtual machine being migrated, for example, as described in the examples above. The system includes a computer system 570 and a NIC 550. The computer system 570 may include an initial CPU that is migrating one of its guests to another computer system. The computer system 570 includes a memory 520 and one or more processors 526 in communication with the memory 520. The NIC 550 includes a memory 560 and one or more processors 510 in communication with the memory 560. The computer system 570 and the NIC 550 may communicate with each other, for example, through an IOMMU.

Memory 560 stores information accessible by processor 510, including instructions 564 that may be executed by the processor 510. The memory also includes data 562 that may be retrieved, manipulated or stored by the processor. The memory may be of any type capable of storing information accessible by the processor, such as a hard-drive, memory card, ROM, RAM, DVD, CD-ROM, write-capable, and read-only memories. The memory 560 includes data 562 that may be retrieved, manipulated or stored by the processor in accordance with the instructions 564. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 564 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The instructions 564 may be executed by the processor, for example, to detect and copy incremental changes to pages of virtual memory. For example, the instructions 564 may provide for writing data to a virtual machine that is being migrated to a target host and identifying incremental changes. For example, the instructions may provide for determining changes made to particular pages of the virtual machine after those particular pages were copied to the target host. Information relating to the identified incremental changes may be stored by the NIC 550. For example, the NIC 550 may maintain information in its own memory 560 regarding dirtied pages. According to another example, the NIC 550 may write information to other devices, such as to a buffer of bytes maintained at a host of the virtual machine or elsewhere.

Although FIG. 5 functionally illustrates the processor 510 and memory 560 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 510. Similarly, the processor 510 may actually comprise a collection of processors which may or may not operate in parallel.

The memory 520 includes data 522 and instructions 524. The memory 520 may be any of the types and may include any of the features described above in connection with the NIC memory 560. The instructions 524 provide for copying pages of a guest, detecting incremental changes, and copying the incremental changes. The incremental changes may be detected by, for example, accessing information provided by the NIC 550.

The one or more processors 526 may also take any of the forms described above in connection with the NIC processor(s) 510. Moreover, the memory 520 and/or the one or more processors 526 may be part of a hypervisor.

Returning to examples of identifying dirtied pages on behalf of a guest, yet another example uses Virtualization Technology for Directed I/O (VT-d). For example, using virtualized VT-d, the virtual machine being migrated may indicate to the hypervisor the pages for which it intends to give write access to the NIC. In this example, the entire set of pages indicated by the virtual machine may be assumed to be dirty.

FIG. 6 illustrates a further example of identifying the dirty pages. In this example, page tables in an IOMMU may be manipulated to indicate the dirtied pages. For example, as shown, IOMMU 630 uses tables 632, 634 for mapping data, etc. The NIC can set dirty bits in page table entries in the tables 632, 634, or a dirty bit can be created out of reserved bits in the tables 632, 634. For example, the tables may be VT-d tables or any other tables typically used by an IOMMU, but the tables 632, 634 may be modified to indicate dirty bits. The table 632 is shown as including additional columns for indicating a given page of a virtual machine and whether or not that page has been dirtied. The hypervisor may use the page tables 632, 634 to perform the same memory scan for dirty pages as it performs for normal accessed memory.

Figure 7:
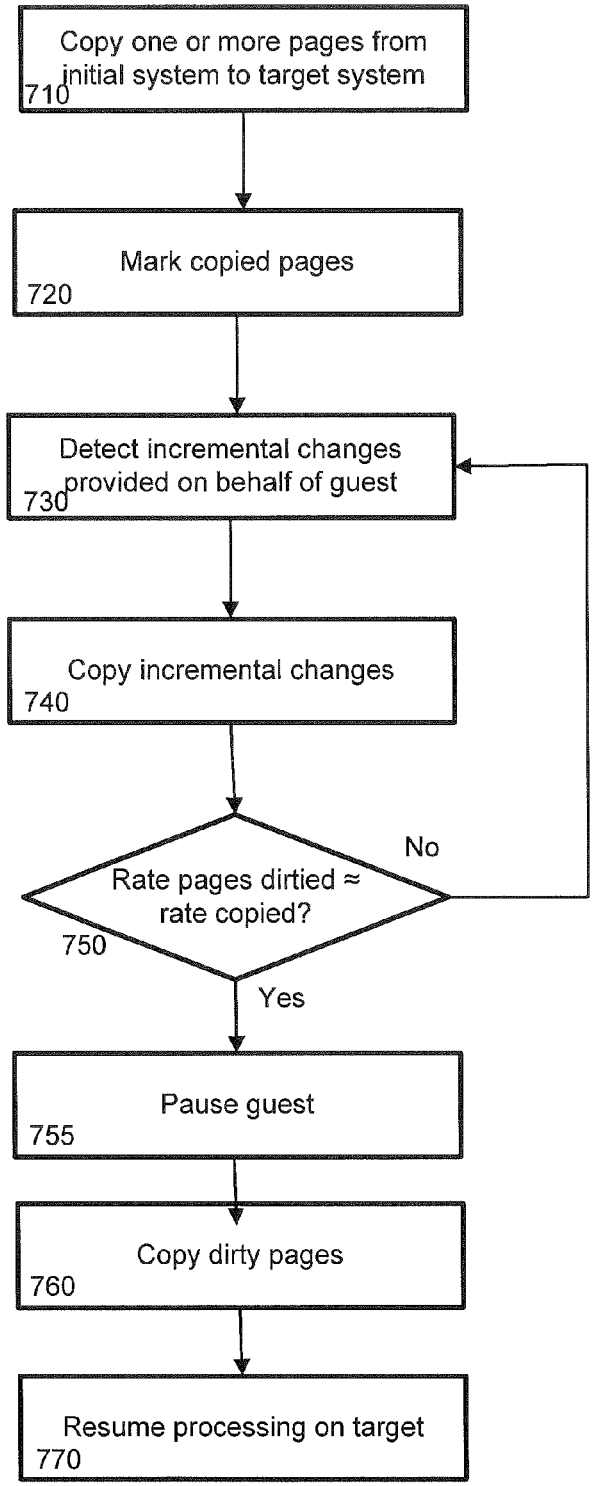
FIG. 7 is a flow diagram of an example method according to aspects of the disclosure.

FIG. 7 provides an example flow diagram illustrating a method 700 for live migration of a virtual machine or other guest from an initial host to a target host. It should be understood that the operations involved in the below methods need not be performed in the precise order described. Rather, various operations may be handled in a different order or simultaneously, and operations may be added or omitted.

In block 710, one or more pages are copied from an initial host to a target host. For example, a hypervisor may copy pages from its system to another system.

In block 720, the copied pages are marked. For example, the pages may be marked as not dirty or not writeable. The marking may be performed by, for example, the hypervisor of the initial host, or another component in the computer system, such as a NIC.

In block 730, incremental changes are detected. For example, pages dirtied after copying may be detected in any of the ways described above, including but not limited to by a NIC tracking DMA_addr_t type pages, by the NIC tracking pages that it has written to after copying using byte-enables, using virtualization VT-d, or using page-table manipulation.

In block 740, the incremental changes are copied to the target host. Detection and copying of the incremental changes may be performed continuously until a predetermined event, such as when a rate at which pages are dirtied approximates a rate at which the incremental changes can be copied to the target host. Alternatively or additionally, the guest may be paused while the dirtied pages are copied.

In block 750 it is determined whether the rate at which pages are dirtied approximates the rate at which the incremental changes can be copied. If not, the method 700 returns to block 730, where incremental changes continue to be detected.

If the rate of dirtying approximates the rate of copying, the virtual machine running on the initial host may be paused (block 755) and the dirtied pages are copied in block 760.

In block 770, processing is resumed on the target host.

The foregoing techniques are advantageous in that they provide for moving the active processes of the guest virtual machine from the first host to the second host with minimal impact on the guest. The guest processes may be subject to minimal or no delay or termination.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for live migration of a guest in a computer system using device assignment, the method comprising:
    copying one or more pages of the guest from an initial computer system to a target computer system, the initial computer system having one or more processors coupled to a network interface controller (NIC) through an input/output memory management unit (IOMMU);
    determining, using the one or more processors, which pages have been copied;
    determining, using the one or more processors, incremental changes made to the pages that have been copied, the determining including accessing page table entries in the IOMMU, wherein the page table entries were modified by the NIC; and
    copying the incremental changes from the initial computer system to the target computer system.

2. The method of claim 1, wherein accessing information provided by the NIC comprises accessing a list of dirtied pages tracked by the NIC.

3. The method of claim 1, wherein accessing information provided by the NIC comprises accessing a buffer of bytes, the buffer comprising a plurality of entries with each entry corresponding to at least a portion of a page of the guest, wherein the buffer is updated by the NIC when the NIC writes to the page of the guest.

4. The method of claim 1, wherein determining the incremental changes comprises receiving information from the guest indicating the pages for which the guest provided write access.

5. The method of claim 1, wherein determining which pages have been copied comprises marking the copied one or more pages of the guest as one of not dirty and not writeable.

6. The method of claim 1, further comprising determining whether a rate at which pages are dirtied approximates a rate at which dirtied pages can be copied to the target computer system.

7. The method of claim 6, further comprising continuing to determine and copy incremental changes if the rate at which pages are dirtied does not approximate a rate at which dirtied pages can be copied.

8. The method of claim 6, further comprising copying all dirtied pages and resuming processing on the target computer device if the rate at which pages are dirtied approximates a rate at which dirtied pages can be copied.

9. An apparatus for live migration of a guest in a computer system using device assignment, the apparatus comprising:
  a memory;
  one or more processors in communication with the memory, the one or more processors coupled to a network interface controller (NIC) through an input/output memory management unit (IOMMU), the one or more processors performing tasks comprising:
    copying one or more pages of the guest to a target computer system;
    determining which pages have been copied;
    determining incremental changes made to the pages that have been copied, the determining including accessing a buffer of bytes, the buffer comprising a plurality of entries with each entry corresponding to at least a portion of a page of the guest, wherein the buffer is updated by the NIC when the NIC writes to the page of the guest; and
    copying the incremental changes to the target computer system.

10. The apparatus of claim 9, wherein accessing information provided by the NIC comprises accessing a list of dirtied pages tracked by the NIC.

11. The apparatus of claim 9, wherein accessing information provided by the NIC comprises accessing page table entries in the input/output memory management unit, wherein the page table entries were modified by the NIC.

12. The apparatus of claim 9, wherein determining the incremental changes comprises receiving information from the guest indicating the pages for which the guest provided write access.

13. The apparatus of claim 9, further comprising determining whether a rate at which pages are dirtied approximates a rate at which dirtied pages can be copied to the target computer system.

14. The apparatus of claim 13, further comprising copying all dirtied pages and resuming processing on the target computer system if the rate at which pages are dirtied approximates a rate at which dirtied pages can be copied.

15. A method for live migration of a guest in a computer system using device assignment, the method comprising:
  copying one or more pages of the guest from an initial computer system to a target computer system, the initial computer system having one or more processors coupled to a network interface controller (NIC) through an input/output memory management unit (IOMMU);
  receiving at the one or more processors information from the guest regarding which of the one or more pages it intends to give write access to the NIC;
  determining, using the one or more processors, which pages have been copied;
  determining, by the NIC, incremental changes made to the pages that have been copied based on the information received from the guest; and
  copying, using the one or more processors, the incremental changes from the initial computer system to the target computer system.

16. A system for live migration of a guest in a computer system using device assignment, comprising:
  a memory;
  one or more processors in communication with the memory, the one or more processors coupled to a network interface controller (NIC) through an input/output memory management unit (IOMMU), the one or more processors performing tasks comprising:
    copying one or more pages of the guest to a target computer system;
    determining which pages have been copied;
    determining incremental changes made to the pages that have been copied, the determining including accessing page table entries in the IOMMU, wherein the page table entries were modified by the NIC; and
    copying the incremental changes to the target computer system.

17. A system for live migration of a guest in a computer system using device assignment, comprising:
  a memory;
  one or more processors in communication with the memory, the one or more processors coupled to a network interface controller (NIC) through an input/output memory management unit (IOMMU), the one or more processors performing tasks comprising:
    copying one or more pages of the guest to a target computer system;
    receiving information from the guest regarding which of the one or more pages it intends to give write access to the NIC;
    determining which pages have been copied;
    determining, with the NIC, incremental changes made to the pages that have been copied based on the information received from the guest; and
    copying, using the one or more processors, the incremental changes to the target computer system.

* * * * *